(12) United States Patent
Kalevo

(10) Patent No.: US 7,715,638 B2
(45) Date of Patent: May 11, 2010

(54) PROCESSING OF IMAGES USING A LIMITED NUMBER OF BITS

(75) Inventor: Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 1173 days.

(21) Appl. No.: 10/755,868

(22) Filed: Jan. 12, 2004

(65) Prior Publication Data
US 2004/0202375 A1    Oct. 14, 2004

(30) Foreign Application Priority Data
Jan. 13, 2003    (FI)    .................................. 20030045

(51) Int. Cl.
G06K 9/46    (2006.01)
(52) U.S. Cl. .................... 382/238; 382/244; 375/245
(58) Field of Classification Search ................ 382/238, 382/100; 386/109; 702/3; 704/217
See application file for complete search history.

(56) References Cited

U.S. PATENT DOCUMENTS

| | | | |
|---|---|---|---|
| 4,270,025 A * | 5/1981 | Alsup et al. .................. | 704/217 |
| 4,369,463 A | 1/1983 | Anastassiou et al. | |
| 4,491,953 A | 1/1985 | Bellisio et al. | |
| 4,622,579 A | 11/1986 | Starck | |
| 4,734,768 A | 3/1988 | Pexa | |
| 4,791,660 A * | 12/1988 | Oye et al. .................. | 379/88.1 |
| 4,847,866 A * | 7/1989 | Jones et al. .................. | 375/245 |
| 4,875,090 A * | 10/1989 | Shimokoriyama et al. ...................... | 375/240.01 |
| 5,294,745 A * | 3/1994 | Yamauchi et al. ............. | 84/601 |
| 5,392,037 A * | 2/1995 | Kato .......................... | 341/67 |
| 5,680,129 A * | 10/1997 | Weinberger et al. ........... | 341/65 |
| 5,689,612 A * | 11/1997 | Abe .......................... | 386/109 |
| 5,754,698 A * | 5/1998 | Suzuki et al. ............... | 382/232 |
| 5,790,705 A * | 8/1998 | Anderson et al. ........... | 382/244 |

(Continued)

FOREIGN PATENT DOCUMENTS

DE    42 10 246    9/1993

(Continued)

OTHER PUBLICATIONS

M. C. W. Van Buul, "Hybrid D-PCM, a Combination of PCM and DPCM," Concise Papers, *IEEE Transactions on Communications*, vol. COM-26, No. 3, Mar. 1978, pp. 362-368.

*Primary Examiner*—Daniel G Mariam
*Assistant Examiner*—Aklilu K Woldemariam
(74) *Attorney, Agent, or Firm*—Ware, Fressola, Van Der Sluys & Adolphson LLP

(57) ABSTRACT

The invention relates to a method as well as a system, a device, an encoder and a decoder, and a computer software product for image processing by the method. In the invention, the number of bits is limited in the bit string of a pixel to be processed, wherein the pixel is encoded with the limited number of bits. A prediction value corresponding to said pixel is searched for. If it is found, the difference between the pixel and the prediction value is determined, to select the method for encoding the bit string of said pixel. Also, a code word is encoded in the bit string, to indicate the selected encoding method. If the prediction value is missing, the number of bits in said pixel is limited by quantizing. By means of the invention, a fixed number of bits is obtained for all encoded pixels in an image.

30 Claims, 4 Drawing Sheets

U.S. PATENT DOCUMENTS

| | | | | |
|---|---|---|---|---|
| 5,852,469 | A * | 12/1998 | Nagai et al. | 375/240.23 |
| 5,907,374 | A * | 5/1999 | Liu | 375/240.26 |
| 5,907,638 | A * | 5/1999 | Onodera | 382/239 |
| 6,597,990 | B2 * | 7/2003 | Brown | 702/3 |
| 6,603,413 | B2 * | 8/2003 | Igarashi et al. | 341/67 |
| 6,757,406 | B2 * | 6/2004 | Rhoads | 382/100 |
| 6,937,170 | B2 * | 8/2005 | Otsuka | 341/67 |
| 6,954,156 | B2 * | 10/2005 | Kadono et al. | 341/67 |
| 7,010,003 | B2 * | 3/2006 | Watanabe et al. | 370/522 |
| 7,026,960 | B2 * | 4/2006 | Lee et al. | 341/50 |
| 7,055,018 | B1 * | 5/2006 | Bratt et al. | 712/4 |
| 7,068,845 | B2 * | 6/2006 | Kondo et al. | 382/224 |
| 7,088,269 | B2 * | 8/2006 | Kadono et al. | 341/67 |
| 7,236,526 | B1 * | 6/2007 | Kitamura | 375/240.16 |
| 7,248,190 | B2 * | 7/2007 | Kadono et al. | 341/67 |
| 2002/0015528 | A1 * | 2/2002 | Kondo et al. | 382/224 |

FOREIGN PATENT DOCUMENTS

| | | |
|---|---|---|
| GB | 2 226 206 | 6/1990 |
| JP | 02-248162 | 10/1990 |
| JP | 02-305271 | 12/1990 |
| JP | 5-207286 | 8/1993 |
| JP | 10-327418 | 12/1998 |
| JP | 11-069164 | 3/1999 |
| JP | 11-98511 | 4/1999 |
| JP | 11-98512 | 4/1999 |
| JP | 2001-313943 | 11/2001 |
| JP | 2001-524297 | 11/2001 |
| WO | WO 97/40630 | 10/1997 |
| WO | WO 01/54416 | 7/2001 |
| WO | WO 03/063491 | 7/2003 |

* cited by examiner

PROCESSING OF IMAGES USING A LIMITED NUMBER OF BITS

CROSS-REFERENCE TO RELATED APPLICATIONS

This application claims priority under 35 USC §119 to Finnish Patent Application No. 20030045 filed on Jan. 13, 2003.

FIELD OF THE INVENTION

The present invention relates to a method for processing images, in which method the number of bits per pixel is limited, wherein the pixel is encoded with the limited number of bits. The present invention also relates to a system for image processing, which system is arranged to process the image using a limited number of bits in the bit sequence per pixel, wherein the system also comprises means for encoding the pixel to the limited number of bits. Furthermore, the present invention relates to a device for image processing, which device is arranged to process the image using a limited number of bits in the bit sequence per pixel, wherein the device also comprises means for encoding the pixel to the limited number of bits. The invention also relates to a computer software product for image processing. The invention also relates to a camera module and a circuit comprising an encoder and a decoder. Furthermore, the invention relates to a device for image processing, which device comprises a decoder.

BACKGROUND OF THE INVENTION

Digital cameras comprise semiconductor cells, such as CCD (Charge Coupled Device) or CMOS (Complementary Metal-Oxide Semiconductor) cells comprising a photosensitive sensor. The operation of the sensor in the cell is based on the principle that it is always charged when radiation impinges on it. The cell comprises densely placed parallel pixels which convert light to electrical signals. For colour detection, the pixels of the cell are covered by a filter which transmits, at certain pixels, only red colour, only green colour and only blue colour, respectively, forming a colour filter array. There is a given number (N) of bits per each pixel. If the data processing unit is capable of processing images of M bits and if N>M, a conversion of the image to a smaller size is needed, which means a reduction in the number of bits per pixel.

Normally, the number of bits per pixel is 8 bits, but there are cases in which a greater number is used, for example 10 bits per pixel. Normally, in a data processing device, one byte consists of 8 bits; therefore, it will be necessary to compress an image of 10 bits.

Furthermore, the compression of the image is necessary, because the digital reproduction and processing of images is no longer limited to computers but, to an increasing extent, images can be produced and displayed with smaller devices, such as, for example, mobile communication devices. In mobile communication devices, the use of images is largely similar to the use in computers. Images are stored in the device and they are transmitted to another device across a communication network in use. The transmission of images in the communication network, such as a mobile telephone network, is problematic because of the large quantity of information. Because the available communication channel is slow, the image material must be compressed so that several minutes would not be taken for the transmission of a single image.

DPCM (differential pulse code modulation) is a known method, by which a pixel is encoded/transmitted on the basis of the preceding pixel. The method is used for the conversion of an analog signal to a digital signal, wherein the difference between a sampled value of the analog signal and its predicted value is quantized and encoded in digital format. Code words formed by the DPCM method represent differences between values.

By differentiating the pulse code modulated (PCM) code words, a DPCM code word sequence of variable length is obtained, which normally compresses the given data to a format suitable for the transmission. Because the code words are normally of variable length, the result is not always necessarily below the predetermined bit number (M), because the longest code word is longer than the original number (N) of bits. To make sure that the code word is shorter than the limit value (M), the DPCM code words must be quantized, after which the compression method becomes lossy.

This problem is discussed in the publication DE 4210246 A1 which discloses a DPCM image codec supplemented with PCM technology. A questionable method is used to reduce the quantity of data in a digital image. In the method, the process of encoding digital data is used to convert the data with M bits per pixel to a code word of N bits, when N<M. The choice between the PCM and DPCM methods is made with respect to the difference values in the grey level. The decoding process is used to make sure that the length of the produced code word is less than 9 bits, but this code word length is not fixed but it varies according to the grey level changes in the image. The method presented in the publication is based on a state machine which will require control signals to operate. The decoding of the pixels of varying length is thus strongly dependent on other pixels. Another problem in the decoding of pixels with varying length according to related art is that it is not easy to determine from the code stream, which pixel each code represents.

SUMMARY OF THE INVENTION

The aim of the present invention is to provide an improved method for compressing image data, in which the location of each encoded pixel can be determined independently. This is possible in that the code words have a fixed length, wherein no separate signals will be needed to indicate the initial point of the next code word. By the method of the invention, each image line can also be encoded and decoded independently. This is possible, because no pixel will need information about other pixels on another line. By means of the invention, high-quality compression is achieved for raw data of N bits for its transmission to an image processing module of M bits (M<N). By means of the invention, pixels in an image can be encoded quickly and with little memory capacity without affecting the quality of the image to a noticeable degree.

To achieve the above-mentioned aims, the method according to the present invention is primarily characterized in finding a prediction value corresponding to said pixel. If the prediction value is found, the difference between the pixel and the prediction value is determined, wherein the difference is used to select the encoding method to be used for encoding the bit string of said pixel, wherein the encoded bit string with a fixed length also comprises a code word indicating the encoding method selected for the pixel.

The image processing system according to the invention is characterized in that the system is arranged to search for a prediction value corresponding to said pixel. If the prediction value is found, the system is arranged to determine the difference between the pixel and the prediction value, wherein the means for encoding the pixel are arranged to apply the method corresponding to the difference for encoding the bit string of said pixel as well as to encode, in the bit string, also a code word to indicate the selected encoding method in such a way that the encoded bit string has a fixed length.

The device according to the invention is characterized in that the device is arranged to search for a prediction value corresponding to said pixel. If the prediction value is found, the device is arranged to determine the difference between the pixel and the prediction value, wherein means for encoding the pixel are arranged to apply the method corresponding to the difference for encoding the bit string of said pixel as well as to encode, in the bit string, also a code word to indicate the selected encoding method in such a way that the encoded bit string has a fixed length.

The computer software product according to the invention is characterized in that the storage means of the computer software product comprises computer instructions to search for a prediction value corresponding to said pixel, computer instructions to determine the difference between the pixel and the prediction value, computer instructions for encoding the pixel by the encoding method indicated by the difference, as well as computer instructions to encode the code word representing the encoding method indicated by the difference, in such a way that the encoded bit string has a fixed length.

The camera module according to the invention is characterized in that the camera module comprises means to search for a prediction value corresponding to the pixel, wherein the camera module comprises means to determine the difference between the pixel and the prediction value, wherein the means for encoding the pixel are arranged to perform the encoding of the bit string of said pixel by the encoding method indicated by the difference as well as to encode, in the bit string, also a code word to represent the encoding method indicated by the difference, in such a way that the limited bit number is fixed to substantially all the encoded pixels of the image.

The circuit according to the invention is characterized in that the encoder comprises memory means for storing the pixel as a prediction value, wherein the encoder is arranged to retrieve the prediction value corresponding to the pixel from said memory means. The encoder also comprises means for determining the difference between the pixel and the prediction value, wherein the encoder is arranged to encode said pixel by the encoding method indicated by the difference, as well as to encode, in the bit string, also a code word to represent the encoding method indicated by the difference, in such a way that the limited number of bits is fixed to substantially all the encoded pixels of the image.

The device according to the invention, comprising a decoder, is characterized in that the decoder is arranged to recognize the code word in the bit string and to decode the pixel by the encoding method indicated by the code word. The decoder also comprises storage means for storing at least one decoded pixel as a prediction value, wherein the decoder is arranged to retrieve the prediction value corresponding to the pixel from said storage means.

In other words, in the invention, minor changes between pixels are encoded with a differential pulse code, wherein major changes between pixels are encoded with a pulse code. In the method according to the invention, no control signals will be needed to select the method for decoding the pixel, wherein each pixel can be decoded independently. This is achieved in that the bit format at the beginning of the bit string indicates the decoding method to be used. The encoding system is formed in such a way that the bit resolution decreases gradually more slowly than the number of colours increases in each encoding alternative. The quality of the image is not affected in the method, because the bit format indicating the last encoding method is the shortest of all, wherein more bits are left for encoding of the colour value than in the other alternatives. However, in proportion to the number of colours, there are fewer bits.

By the present invention, the process for encoding pixels becomes faster and, furthermore, the method of the invention requires less memory capacity than methods of related art. The image produced according to the invention is of a better quality than images produced by the lossy methods of related art. In the method, fixed code words are formed which are easier to decode and which guarantee an output suitable for transmission. The codec according to the invention is simple to implement, and it does not require large buffers, because less buffering can be used in connection with fixed code words, or no buffering is needed at all.

DESCRIPTION OF THE DRAWINGS

In the following, the invention will be described in more detail with reference to the appended drawings, in which.

DETAILED DESCRIPTION OF THE INVENTION

In the more detailed description of the invention, the following variables will be used:

Xorig to determine the original pixel value (e.g. 10 bits),
Xpred to determine the predicted pixel value,
Xdiff to determine the difference between the original and predicted values (Xorig−Xpred),
Xenco to determine the encoded pixel value (e.g. 8 bits), and
Xdeco to determine the decoded pixel value.

The basic idea of the invention is that if the prediction is sufficiently good, that is, the difference between the original and predicted pixel values is smaller than a predetermined limit value (abs(Xdiff)<Lim), the difference value is transferred, in quantized format, to the DPCM codec. Otherwise, the original value is transferred, in quantized format, to the PCM codec. Information about the selected codec is also transferred in connection with said values. In both methods, a fixed number (M) of bits is used to represent one pixel. The bit number M is determined according to the capacity to be used.

Figure 1:
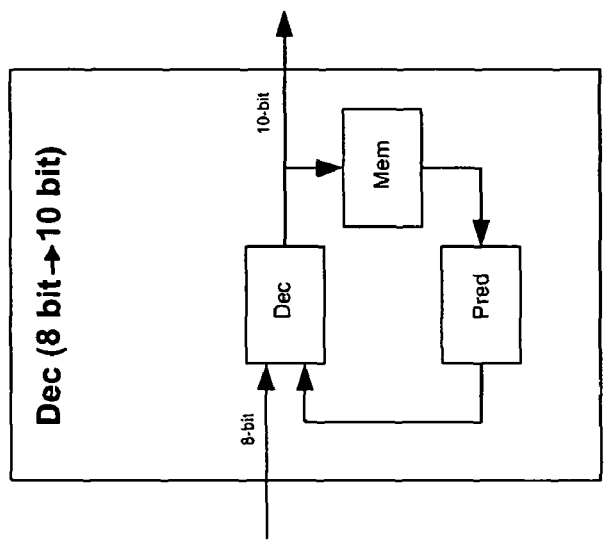
FIG. 1 shows an advantageous example of an encoder/decoder according to the invention, implementing a 10-8-10 bit conversion.
Figure 1:
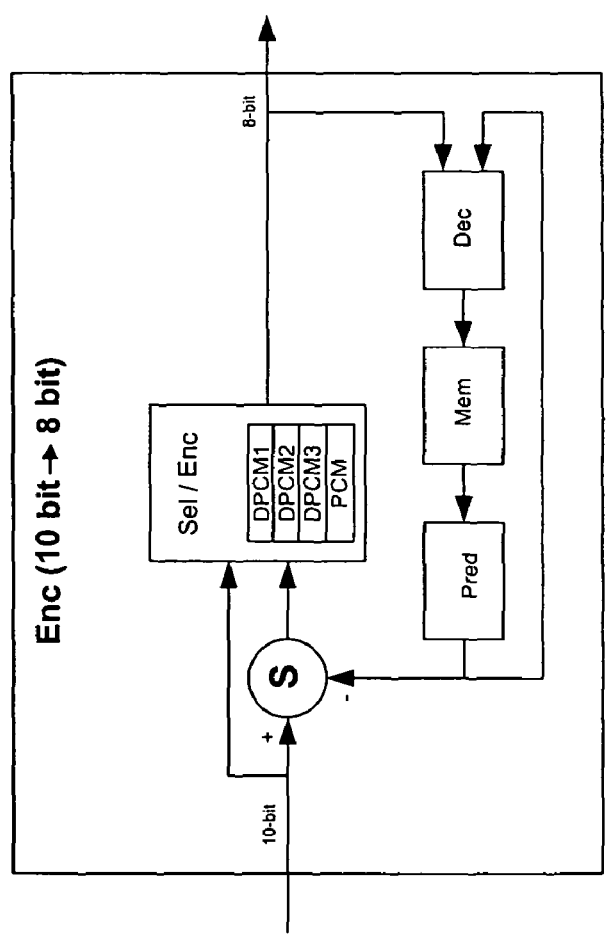

In an advantageous embodiment of the invention, an example of a 10-bit colour image is processed, which is compressed to 8 bits for the time of image transmission and processing. FIG. 1 shows an advantageous embodiment of an encoder/decoder implementing the method. In addition, Table 1 below shows the encoding of a pixel as an example. In the table, fourteen pixels of a random pixel line are collected, which are encoded by the method according to the invention. The table shows the original pixel (Xorig), the prediction value (Xpred) corresponding to the original, the difference (Xdiff) between the original pixel and the prediction value, the encoded bit string (Xenco) of the pixel, and the decoded pixel (Xdeco). In the example in the table, the original pixel (Xorig) consists of 10 bits and is encoded to a pixel of eight bits (Xenco). The encoded bit string (Xenco) is further decoded to 10 bits by the method according to the invention. Naturally, the presented values are only examples and they shall not be interpreted to restrict the invention.

TABLE 1

| Xorig | Xpred | Xdiff | Xenco | Xdeco |
|-------|-------|-------|-------|-------|
| 302 | Not available |  | 01001011 | 302 |
| 120 | Not available |  | 00011110 | 122 |
| 156 | 302 | −146 | 1 0010011 | 156 |
| 90 | 122 | −32 | 010 1 0000 | 90 |
| 135 | 156 | −21 | 00 1 10101 | 135 |
| 94 | 90 | 4 | 00 0 00100 | 94 |
| 154 | 135 | 19 | 00 0 10011 | 154 |
| 118 | 94 | 24 | 00 0 11000 | 118 |
| 235 | 154 | 81 | 011 0 0100 | 235 |
| 98 | 118 | −20 | 00 1 10100 | 98 |
| 137 | 235 | −98 | 011 1 1000 | 138 |
| 90 | 98 | −8 | 00 1 01000 | 90 |
| 138 | 138 | 0 | 00 1 00000 | 138 |
| 88 | 90 | −2 | 00 1 00010 | 88 |

In an advantageous embodiment of the invention, one pixel is used for prediction, wherein the value on the left hand side of the pixel is used as the prediction value (Xpred). If there is no prediction value available, that is, in a situation in which the two first pixels of an image line are processed, the original pixel is quantized from N bits to M bits and is transferred to the PCM codec. In a second advantageous embodiment of the prediction, more pixels can be used, for example three pixels, wherein the prediction value is evaluated from three pixels (upper, left, upper left pixels) adjacent to a pixel. The three-pixel prediction is preferably implemented in a way presented in the applicant's Finnish patent application No. 20000131. This kind of a prediction will give a better final result in the invention, but it will require more memory capacity than prediction by one pixel and it will eliminate the possibility to encode and decode each image line independently. For this reason, the more detailed description of the invention will focus on the prediction using one pixel.

Figure 4:
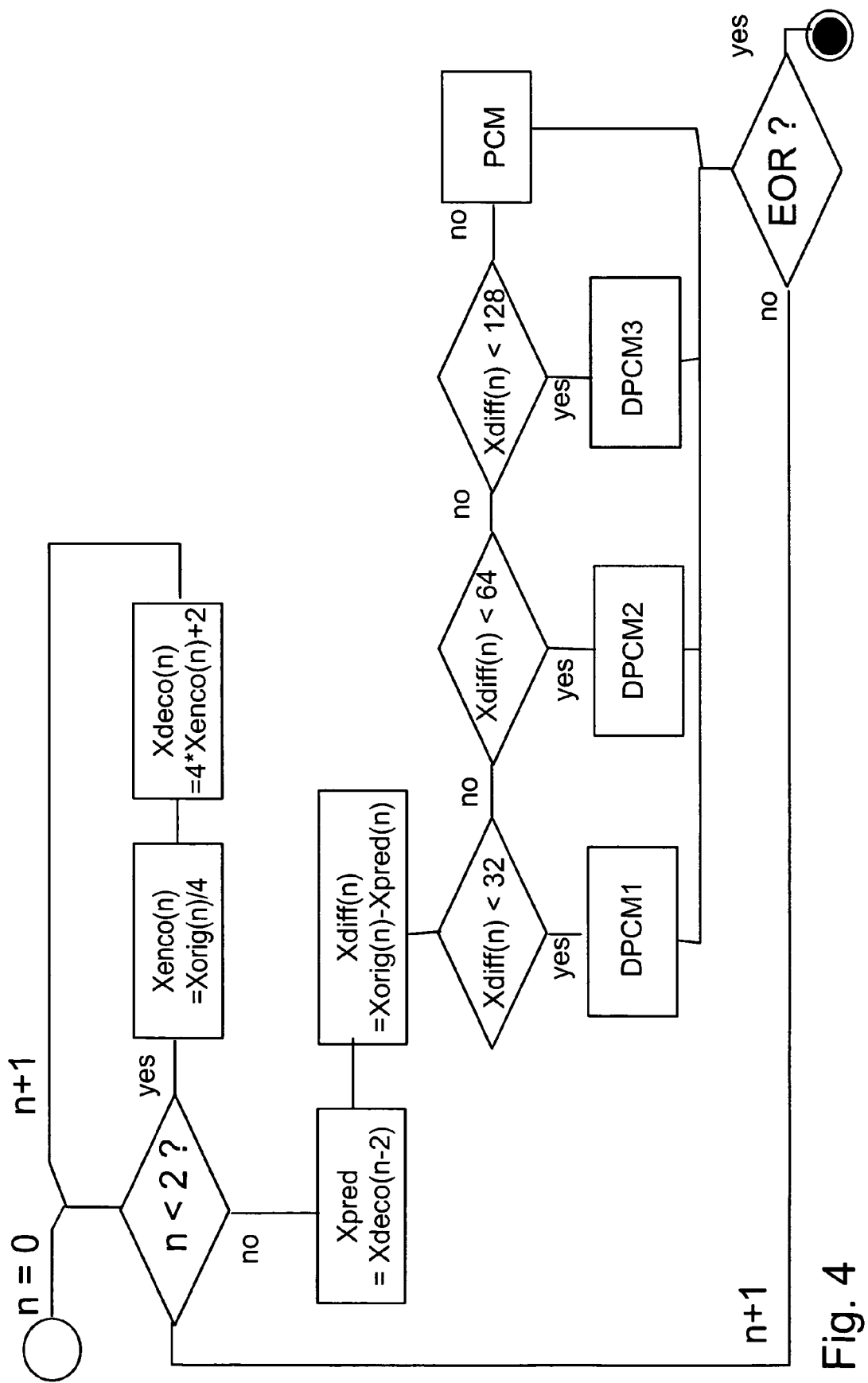
FIG. 4 shows a flow chart of the operation of the encoder according to a particularly advantageous embodiment of the invention.

The image is encoded in such a way that the same line method is used for encoding each line in the image. The encoding principle according to the invention, for one line, is illustrated in the flow chart of FIG. 4. From the Bayer matrix image, which is the best known form of said colour matrix (CFA), it is known that the data of a colour image is represented in such a way that between two identical colour components on the same line, there is another colour component (for example, GRGRGR or BGBGBG, with red R, green G, blue B). On the basis of this information, the prediction can be implemented in such a way that in the prediction of a pixel X(n), the preceding decoded pixel of the same colour is used, wherein, in other words, the pixel X(n−2) preceding the preceding one is used, which is, consequently, of the same colour as the pixel X(n). Naturally, there is no preceding value (to be used in the prediction) for the first two pixels at the beginning of an image line, wherein the original value is quantized.

$$Xenco(0)=Xorig(0)/4$$

The reason for using number four as a quantizer is that, in the example, the value is to be compressed from 10-bit data to 8-bit data (1024/256=4). If Xenco(0)=0, the value 1 (00000001) is transferred, to avoid the code word '0' (00000000). The decoded code word can be formed as follows:

Xdeco(0)=4×Xenco(0)+2, in which the number two is added for rounding.

The second pixel Xorig(1) is processed accordingly (Xenco(1)=Xorig(1)/4), because it is of a different colour than the pixel Xorig(0).

To encode the third pixel (n=2), a prediction will be needed, for which the decoded value of the same colour, preceding the pixel in question, is used, to obtain the prediction value for the third pixel Xpred(2)=Xdeco(2−2). In the general format, the prediction value is obtained Xpred(n)=Xdeco(n−2)), when n indicates the location of the pixel. The change (difference) in the pixel can be determined by calculating Xdiff(n)=Xorig(n)−Xpred(n).

If the absolute value of the change between the pixel in question and the prediction value is sufficiently small (<128), the DPCM codec will be used in the encoding. If the absolute value of the change between the pixel in question and the prediction value is high (>127), the PCM codec will be used in the encoding (to be described in more detail under section (1) below).

The encoded bit string comprises, in the beginning, a code word, from which the magnitude of the change is detected (00, 010, 011; <32, 32 to 63, 64 to 127, respectively). The length of the code word corresponds to the lengths of Huffman code words, which are 1, 2, 3 and 3. The code word with the length of one is reserved for the symbol indicating escape from the encoding method, which should be either "0" or "1". Preferably, the code word for the escape symbol is "1", because thereby the second smallest code word, having a length of 2, can be selected to be "00". As the reason for the choice can be given the fact that it is thus possible to avoid the complete code word "00000000" when the difference zero is transmitted as the value −0, that is, "00 1 00000". In this way, the complete code word "00000000" does not need to be avoided elsewhere, because the other code words contain at least one "1" in them. When the second code word is selected to be "00", the code word with the length of one must be "1" to make the decoding unambiguous. Because of the unambiguous decoding, the other two code words are thus "010" and "011". If the use of the complete code word "00000000" did not need to be avoided, the code words could naturally be also, for example, "0", "10", "110" and "111". It should be noted that sometimes there may also be a need to avoid other complete code words, such as, for example, "11111111", wherein there may be a need to change the code words. Consequently, the choice of the code words is not restricted to the code words mentioned in the description.

After the code word, one bit is reserved for the sign, because the change between the pixels may be negative. The remaining bits give the change value in a binary representation. In the decoding process, in a corresponding manner, the decoder recognizes the code word at the beginning of the bit string, to select the method to be used for decoding. In the decoding, the pixel value is determined by using the preceding value of the same colour, already decoded, (Xpred(n)=Xdeco(n−2)) as well as the change that was between the original pixel and the preceding pixel of the same colour (value=Xdiff=Xorig(n)−Xpred(n)). The pseudo code below represents a codec implementing the coding/decoding process for each range of change:

DPCM1:

if abs(Xdiff(n))<32, then
    Xenco(n)="00 s xxxxx"
    Xdeco(n)=Xpred(n)+sign*value
    in which 00 is the code word, s represents the sign, and
        "xxxxx" indicates, in five bits, the value=abs(Xdiff(n))/

1, the quantizer being 1. For example, when $X_{diff}(n)=-9$, the coded value $X_{enco}(n)=$"00 1 01001"

DPCM2:

if $abs(X_{diff}(n))<64$, then
   $X_{enco}(n)=$"010 s xxxx"
   $X_{deco}(n)=X_{pred}(n)+sign*(32+2*value)$
   in which 010 is the code word, s represents the sign, and "xxxx" indicates, in four bits, the value=$(abs(X_{diff}(n))-32)/2$, the quantizer being 2. For example, when $X_{diff}(n)=54$ or 55, then the coded value $X_{enco}(n)=$010 0 1011.

DPCM3:

if $abs(X_{diff}(n))<128$, then
   $X_{enco}(n)=$"011 s xxxx"
   $X_{deco}(n)=X_{pred}(n)+sign*(64+4*value+1)$
   if $X_{deco}(n)>1023$, then $X_{deco}(n)=1023$
   if $X_{deco}(n)<0$, then $X_{deco}(n)=0$
   in which 011 represents the beginning of the code word, s represents the sign, and "xxxx" indicates, in four bits, the value=$(abs(X_{diff}(n))-64)/4$, the quantizer being 4. For example, when $X_{diff}(n)=-123, -122, -121$, or $-120$, then the coded value $X_{enco}(n)=$011 1 1011.

It can be seen that in the last clause, the number one is added to the decoded value, which is due to rounding. When the quantizer is four, it follows that four different values are quantized in the same transmission value. These values are (X), (X+1), (X+2) and (X+3), in which X is an integer divisible by four. To minimize the rounding error, the selected return value should be (X+1.5). However, this is not possible, because the return value must be an integer. Consequently, the best choices are (X+1) and (X+2). By probability, the lower figures (X) and (X+1) occur slightly more frequently than the higher figures (X+2) and (X+3), because the number of occurrences is always slightly reduced when the difference is increased, as a result of successful operation of the predictor. Because of this argument, (X+1) has been selected as the return value.

If the change is greater than the highest of said limit values (>127), the PCM codec is used in the advantageous embodiment of the invention (case 1). Thus, the encoded value is not predicted from the preceding value but it is formed of the original pixel value. The change of the encoding method is indicated by a special code word, an escape symbol, which was introduced above in connection with the formation of the code words.

Case 1: First Embodiment PCM else
   $X_{enco}(n)=$"1 xxxxxxx"
   $X_{deco}(n)=8*value+4$
   in which 1 is the code word indicating a change, "xxxxxxx" indicates, in seven bits, the value=$(X_{orig}(n)/8)$, the quantizer being 8. For example, when $X_{diff}(n)=520-527$, then the encoded bit string is "1 1000001".

The encoded bit string applying the PCM method comprises, as the first bit, the escape symbol code word 1, which has been selected so that more bits can be used for the encoding of the colour value than in DPCM methods. By this arrangement, it is possible to guarantee the image quality, because the bit resolution is reduced gradually more slowly than the number of colours is increased in the different encoding alternatives.

The pixels of the image line are coded in a corresponding manner to the end of the line (EOR), by encoding minor changes by the DPCM method and major changer by the PCM method. Correspondingly, the rest of the lines to the end of the image are processed independently in the same way as the preceding pixel line, wherein the whole image can be compressed.

The superiority of the combination of the DPCM and PCM codecs to the DPCM codec alone is well-founded when the combination is compared with the use of the DPCM codec alone. As an example, a situation (case 2) will be presented, in which the DPCM codec is used for encoding both minor and major changes. With this example, the advantages which are achieved by combining the DPCM method with the PCM method in a way according to the invention, can be better understood by a person skilled in the art. It should be noted that this example is only given to illustrate the advantages of the invention; it has no significance in the implementation of the invention.

Case 2: Second Embodiment else
   $X_{enco}(n)=$"1 s xxxxxx"
   $X_{deco}(n)=X_{pred}(n)+sign*(16*value+7)$
   if $X_{deco}(n)>1023$, then $X_{deco}(n)=1023$
   if $X_{deco}(n)<0$, then $X_{deco}(n)=0$
   in which 1 indicates the code word, s represents the sign, and "xxxxxx" indicates, in six bits, the value=$(abs(X_{diff}(n))/16)$, the quantizer being 16. For example, when $X_{diff}(n)=528-543$, then the encoded bit string is "1 0 100001".

It can be seen that the sign bit s "eats" one bit of the value to be quantized, wherein the error with the DPCM codec is greater than with the PCM codec, because the quantizing must be greater. This is because the values to be transferred to the PCM and DPCM codecs are in the ranges [0, 1023] (10 bits) and [−1023, 1023] (11 bits), respectively.

In an advantageous embodiment of the invention, the escape symbol used is the shortest code word "1", as presented above. Although the escape symbol is not the most probable symbol, its choice will result in a situation that the quantizing error is so high that the code word length cannot be increased any further. The impairment in the quality, caused by the longer escape symbol code word, can no longer be restored by reducing the code words of the other symbols and by increasing, for example, the non-quantized range of the more probable symbols. Moreover, it is not worthwhile to implement the processing of a major change in the DPCM codec, because it will result in the same situation as when the length of the escape symbol was increased in the original solution.

It should also be noted that the other symbols than the escape symbol follow the real probability of the symbols. This applies also when the quantizer is greater for greater changes. The length of the code words is based on the quantity of the change in the following way: 1=change[128-1023], 2=[0-31], 3=[32-63], 3=[64-127]. The lengths are based on the shape of the change distribution after the quantizing error has been eliminated. The number of symbols needed in the DPCM codec is fewer than or equal to N−(M−1) (for example, 10−(8−1)=3). In the DPCM encoding according to the invention, preferably all three of these are used. In the calculation of the maximum number of DPCM characters, the equation is based on the length of the value of the escape symbol, which is M−1(8−1=7) bits. For the symbols of the DPCM codec, there is thus no substantial need to use greater or equal quantizing as in connection with the PCM codec. Furthermore, it is not necessary to use two different code words for the same quantizer, because the order of code words can thus be changed or two code words can be combined.

By using the method of the invention, the output, in the worst case, is encoded in 7 to 10 bits. In a corresponding situation, the use of the DPCM codec alone will result in an output which is encoded in 6 to 10 bits. By using the method according to the invention, the signal-to-noise ratio PSNR (Peak Signal Noise Ratio) used for measuring the image quality is in the range from 67.48 dB and 78.01 dB. If the PCM codec is replaced with the DPCM codec, the corresponding figure will drop to the range from 63.67 to 74.48 dB.

The image quality achieved by the arrangement according to the preceding embodiments of the invention can also be achieved by using a smart DPCM codec (case 3), but this will increase the complexity of the codec, which may be a significant obstacle to using this embodiment of the invention in some environments. In this embodiment of the invention, it has been found that even though the values to be coded are in the range from −1023 to 1023, there are only 1024 different values for the prediction. By the other values, an Xdeco value is obtained, which is smaller than 0 or greater than 1023. These values will never occur in the original image. Consequently, in connection with major changes, the DPCM codec can be used in a smart way as follows:

Case 3: Third Embodiment else
   Xenco(n)="1 s xxxxxx"
   in which 1 indicates the beginning of the code word, s represents the sign, and "xxxxxx" indicates, in six bits, the value=(abs(Xdiff(n))/8), the quantizer being 8.
   These high absolute values should be encoded by using values which are not otherwise used in predicting encoding. The example below presents first the change of the range and the decoding.
   if value==64 then value=0
   if value>64 then value=128−value, and the sign is changed
   For example, when abs(Xdiff(n))=528-543, then the encoded bit string is "1 1 111110".
   In the decoding, the following steps are taken:
   if value=0 then
      Xdeco(n)=Xpred(n)+sign*(8*64+7)
   else
      Xdeco(n)=Xpred(n)+sign*(8*value)
      if Xdeco(n)<0, then
         Xdeco(n)=Xdeco(n)+1024+3
      but if Xdeco(n)>1023 then
         Xdeco(n)=Xdeco(n)-1024-3
      else
         Xdeco(n)=Xdeco+sign*3
      if Xdeco(n)>1023, then Xdeco(n)=1023
      if Xdeco(n)<0, then Xdeco(n)=0

FIG. 1 shows an advantageous example of the encoder, and the corresponding decoder, implementing the method of the invention. The encoder implements the bit conversion from 10 bits to eight bits, and the decoder implements, accordingly, the bit conversion from eight to ten bits. The encoder (Enc) comprises a selector (Sel/Enc) which changes the codec according to magnitude of the change in question. DPCM1 is in use, when Xdiff<32, DPCM2 when Xdiff<64, DPCM3 when Xdiff<128, and else PCM. The encoder also comprises an internal decoder (Dec) to implement the decoding of the symbol for prediction (Pred). For this purpose, the two symbols preceding the symbol to be decoded are stored in a memory (MEM), in decoded form. A similar decoding process is also carried out by the actual decoder (Dec 8→10).

Figure 2:
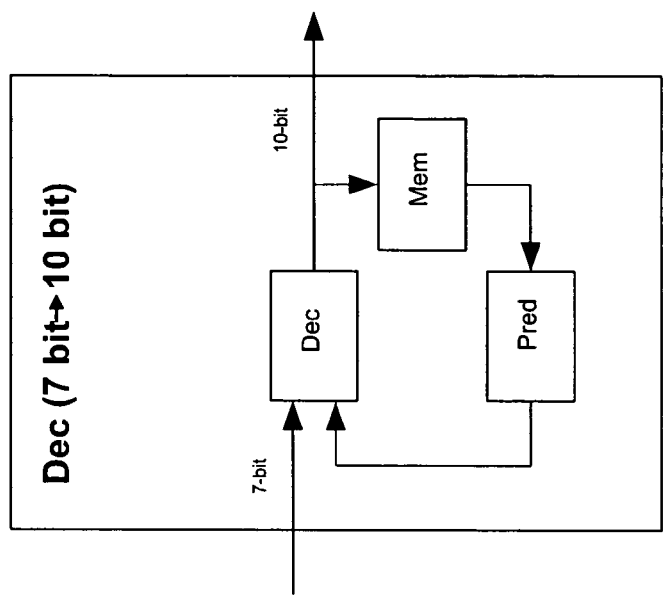
FIG. 2 shows another advantageous example of an encoder/decoder according to the invention, implementing a 10-7-10 bit conversion.
Figure 2:
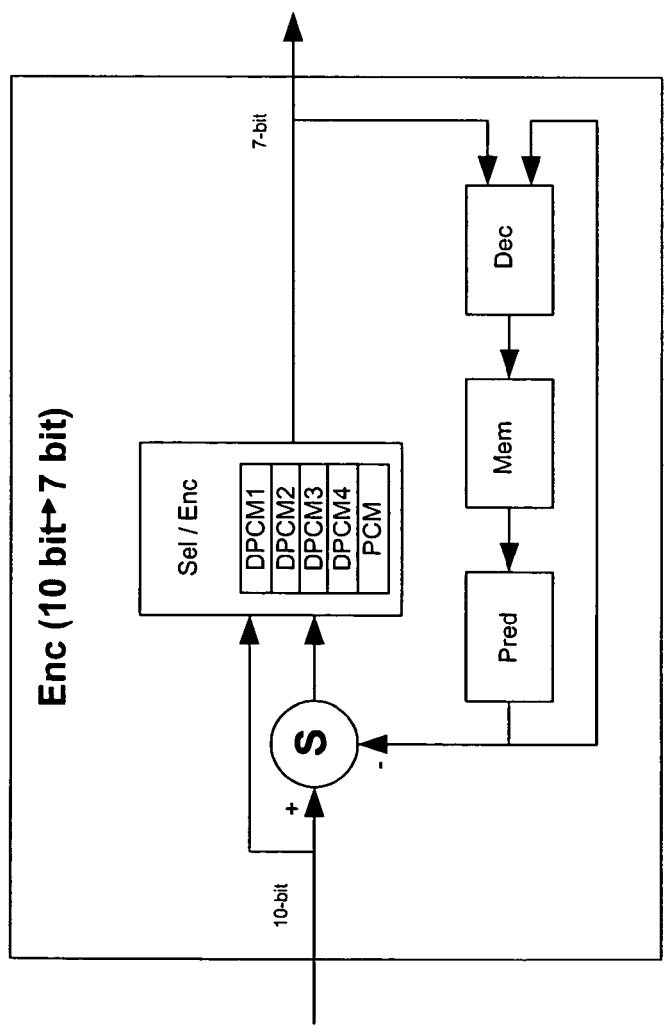

FIG. 2 shows an advantageous example of the encoder and decoder according to the invention, which are arranged to perform the bit conversion from 10 bits to seven bits and back to ten bits. In the prediction, the predictor of FIG. 2 uses all the colour values in the line (two colours per line in Bayer matrix). The first pixel is encoded without prediction. The second pixel is encoded by using the preceding decoded value as the prediction value: Xpred(n)=Xdeco(n−1). The third pixel is predicted by using the preceding decoded value of the same colour as the prediction value: Xpred(n)=Xdeco(n−2). The fourth pixel is predicted by using the equation:

If ((Xdeco(n−1)<=Xdeco(n−2) and Xdeco(n−2)<=Xdeco(n−3)) or (Xdeco(n−1)>=Xdeco(n−2) and Xdeco(n−2)>=Xdeco(n−3)))

then Xpred(n)=Xdeco(n−1)

else Xpred(n)=Xdeco(n−2).

The other pixels in the line are predicted by using the equation:

if ((Xdeco(n−1)<=Xdeco(n−2) and Xdeco(n−2)<=Xdeco(n−3)) or (Xdeco(n−1)>=Xdeco(n−2) and Xdeco(n−2)>=Xdeco(n−3)))

then Xpred(n)=Xdeco(n−1)

but if ((Xdeco(n−1)<=Xdeco(n−3) and Xdeco(n−2)<=Xdeco(n−4)) or (Xdeco(n−1)>=Xdeco(n−3) and Xdeco(n−2)>=Xdeco(n−4)))

then Xpred(n)=Xdeco(n−2)

else Xpred(n)=(Xdeco(n−2)+Xdeco(n−4)+1)/2.

Because the encoder according to the example of FIG. 2 uses four preceding pixels in the prediction, the memory (Mem) is arranged for four pixels accordingly.

In connection with this bit conversion (10-7-10), the encoding/decoding is carried out in a way similar to the conversion from 10 bits to eight bits. However, it must be noted that the code words used and the ranges corresponding to them follow the definition:

if abs(Xdiff(n))<8, then
   Xenco=000 s xxx
   the code word is 000, s=sign, xxx=value=abs(Xdiff(n)/1) given in three bits, the quantizer=1 if abs(Xdiff(n))<16, then
   Xenco(n)="0010 s xx"
   the code word is 0010, s=sign, xx=value=(abs(Xdiff(n))−8)/2 given in two bits, the quantizer=2 if abs(Xdiff(n))<32, then
   Xenco(n)="0011 s xx"
   the code word is 0011, s=sign, xx=value=((abs(Xdiff(n))−16)/4, given in two bits, the quantizer=4 if abs(Xdiff(n))<160, then
   Xenco(n)="01 s xxxx"
   the code word is 01, s=sign, xxxx=value=(abs(Xdiff(n))−32)/8, given in two bits, the quantizer=8.

if abs(Xdiff(n))>160, then
   Xenco(n)="1 xxxxxx"
   the code word is 2, s=sign, xxxxx=value=Xorig(n)/16 given in six bits, the quantizer=16.

As it can be seen from the above, five code words are needed in connection with the bit conversion of the described kind, when four code words are needed in connection with the bit conversion (10-8-10).

Figure 3:
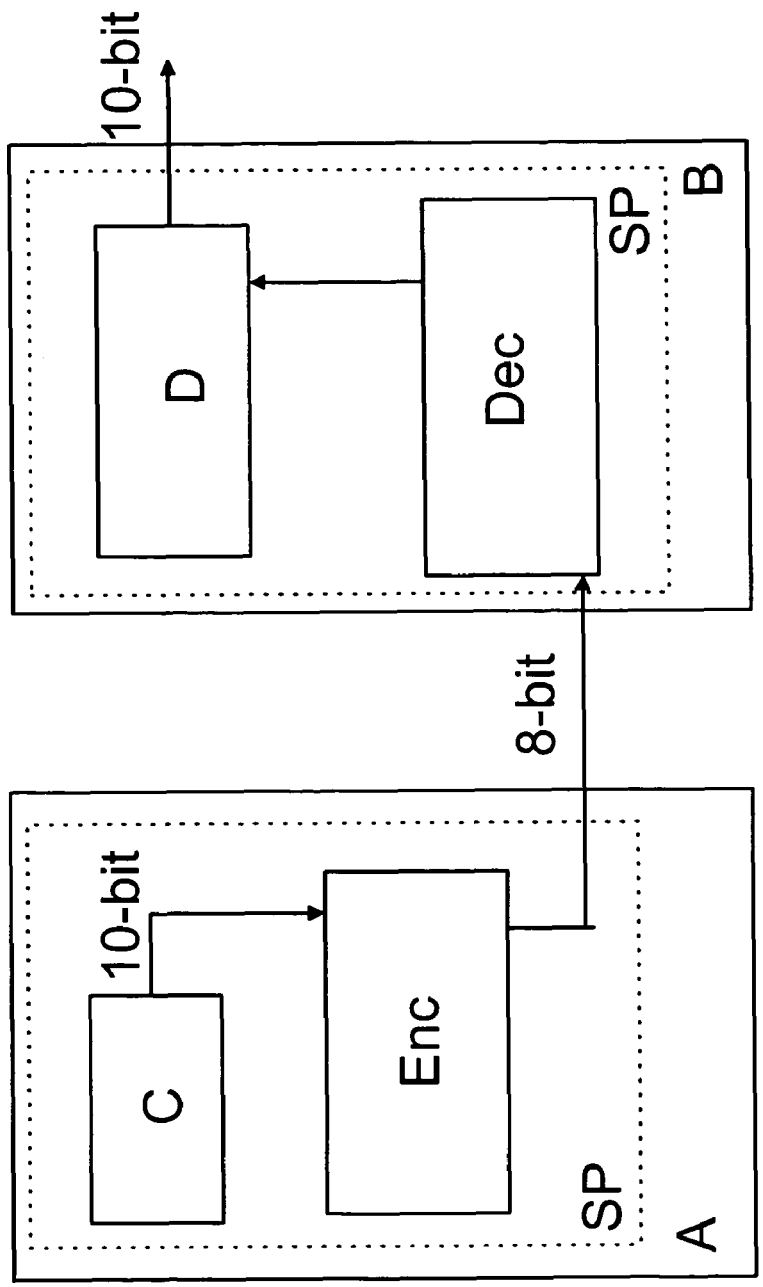
FIG. 3 shows a device performing encoding and/or decoding of an image according to a particularly advantageous embodiment of the invention.

FIG. 3 shows a very reduced view of a system implementing an advantageous embodiment of the invention. The system preferably comprises devices A and B which implement the encoding (Enc)/decoding (Dec) according to the invention, respectively. The devices A, B can be placed physically separately in the system. The devices A, B can also be implemented as a single physical unit. Arrangements of the described type, combining DPCM and PCM modulation or using smart DPCM modulation, can thus be implemented as part of the electronic device, for example in a digital signal processing unit (DSP) in a camera or the like. Typically, the electronic device also comprises other functions, such as means for displaying (D) image information to the user and a processor for controlling the electronic device. A digital camera (C) comprising an image processing system according to the invention can be preferably implemented in connection with a mobile device, either as a separate unit or integrated in the device, which mobile device also comprises means for mobile communication. Furthermore, the digital camera comprising the image processing system according to the invention may be connected to a communication network (e.g. the Internet), such as WebCam. The whole invention can be implemented by using hardware arrangements, a microcodable processor, or alternatively by computer software alone. All combinations of these are also possible. Consequently, the invention can typically also be used as a part of larger software, it can be constructed as part of a separate encoding circuit, or it can be implemented in connection with a camera module to be retailed separately.

In the specification, the present invention has been described according to two advantageous embodiments. It is obvious that the above-described different embodiments of the invention can be combined to provide various embodiments of the invention which comply, as such, with the spirit of the invention. Therefore, the above-presented examples must not be interpreted as restrictive to the invention, but the embodiments of the invention can be freely varied within the scope of the inventive features presented in the claims herein below.

What is claimed is:

1. A method for image processing, in which the number of bits is fixed in an encoded bit string, wherein a pixel is encoded into the bit string, the method comprising:
   if a prediction value is not available for the pixel, encoding a quantized pixel value to the bit string,
   if the prediction value is available for the pixel,
      determining a difference between the pixel value and the prediction value, which difference is used for selecting a method for encoding among more than two encoding methods to encode said pixel into the bit string, each method for encoding having a certain step size for quantizing a value, and said certain step size being different in each method for encoding, wherein the method further comprising;
   determining a code word indicating the selected encoding method on the basis of the original and limited number of bits in the pixel in such a way that the code word length does not exceed N−(M−1) where M corresponds to the limited number of bits and N corresponds to the original number of bits;
   encoding said code word indicating the selected encoding method and the quantizer step size, and the quantized value to the bit string,
   in which method the bit string has a fixed-length smaller than the length of the originally digitized pixel for each encoded pixels in the image.

2. The method according to claim 1, wherein the code word to indicate the selected encoding method is of variable length.

3. The method according to claim 1, wherein quantizing is used to encode the bit string, wherein first a limit value is determined, wherein said difference is compared with said limit value in such a way that when the difference is smaller, the quantized value is determined by quantizing the difference, whereas when the difference is greater, the quantized value is determined by quantizing the original digitized value of the pixel.

4. The method according to claim 1, wherein said code word is determined on the basis of the original and limited number of bits in the pixel in such a way that the code word length is two bits when the absolute value of the difference is less than 32, and that the code word length is three bits when the absolute value of the difference is more than 31 and less than 128, wherein when the absolute value of the difference exceeds 128, the code word length is selected to be one bit, wherein the encoding method is changed.

5. The method according to claim 1, wherein the encoding method to be used is selected between differential pulse code modulation and pulse code modulation coding in such a way that code word lengths greater than one bit indicate the use of differential pulse code modulation coding, wherein the code word length of one bit indicates the use of pulse code modulation coding.

6. The method according to claim 1, wherein the encoding method to be used is selected between ordinary differential pulse code modulation coding and smart differential pulse code modulation coding in such a way that code word lengths greater than one bit indicate the use of differential pulse code modulation coding, wherein the code word length of one bit indicates the use of smart differential pulse code modulation coding.

7. The method according to claim 1, wherein said prediction value is the value of one encoded pixel value or the average of several encoded pixel values.

8. The method according to claim 1, wherein the pixel is encoded for transfer between a camera module and an electronic device.

9. An image processing system comprising a device comprising a processor configured to process an image, wherein the device comprises means for encoding a pixel to an encoded bit string, in which the number of bits is fixed, wherein:
   if a prediction value is not available for the pixel, the means for encoding is configured to encode a quantized pixel value to the bit string,
   if the prediction value is available, the device is configured to determine a difference between the pixel value and the prediction value, which difference is used for selecting a method for encoding among more than two encoding methods to encode said pixel into the bit string, each method for encoding having a certain step size for quantizing a value, and said certain step size being different in each method for encoding a code word indicating the selected encoding method on the basis of the original and limited number of bits in the pixel in such a way that the code word length does not exceed N−(M−1) where M corresponds to the limited number of bits and N corresponds to the original number of bits, and,
   to encode a code word indicating the selected encoding method and the quantizer step size, and the quantized value to the bit string, in which device the bit string has fixed-length smaller than the length of the originally digitized pixel for each encoded pixel in the image.

10. The system according to claim 9, wherein the system is also configured to determine a limit value, wherein the system is also arranged to compare said difference with said limit value in such a way that when the difference is smaller, the system is arranged to determine the quantized value by quantizing the difference, whereas when the difference is greater, the system is arranged to determine the quantized value by quantizing the original digitized value of the pixel.

11. The system according to claim 9, wherein the system is also configured for forming the length of the code word on the basis of the original and limited number of bits in the pixel in such a way that the code word length is two bits when the absolute value of the difference is less than 32, and that the code word length is three bits when the absolute value of the difference is more than 31 and less than 128, wherein when the absolute value of the difference exceeds 128, the code word length is one bit, to change the encoding method.

12. The system according to claim 9, wherein the system also comprises a differential pulse code modulation codec and a pulse code modulation codec, wherein code word lengths greater than one bit indicate the use of the differential pulse code modulation codec, wherein the code word length of one bit indicates the use of the pulse code modulation codec.

13. The system according to claim 9, wherein the system also comprises an ordinary differential pulse code modulation codec and a smart differential pulse code modulation codec, wherein code word lengths greater than one bit indicate the use of the differential pulse code modulation codec, wherein the code word length of one bit indicates the use of the smart differential pulse code modulation codec.

14. The system according to claim 9, wherein said prediction value is the value of one encoded pixel value or the average of several encoded pixel values.

15. The system according to claim 9, wherein the system also comprises means for decoding the bit string to correspond to the encoding.

16. The system according to claim 9, wherein the system also comprises a camera module and an electronic device.

17. The system according to claim 16, wherein the electronic device comprises means for performing mobile communication.

18. A device for image processing, which device comprises a processor configured to process an image, wherein the device comprises means for encoding a pixel to an encoded bit string, in which the number of bits is fixed, wherein:
if a prediction value is not available for the pixel;
the means for encoding is configured to encode a quantized pixel value to the bit string
if the prediction value is available, the means for encoding is configured
to determine the difference between the pixel value and the prediction value, which difference is used for selecting a method for encoding among more than two encoding methods to encode said pixel into the bit string, each method for encoding having a certain step size for quantizing a value, and to determine a code word indicating the selected encoding method on the basis of the original and limited number of bits in the pixel in such a way that the code word length does not exceed N−(M−1) where M corresponds to the limited number of bits and N corresponds to the original number of bits, and,
to encode said code word indicating the selected encoding method and the quantizer step size, and the quantized value to the bit string,
in which device the bit string has fixed-length smaller than the length of the originally digitized pixel for each encoded pixel in the image.

19. The device according to claim 18, wherein the device is also configured for determining a limit value, wherein the device is also arranged to compare said difference with said limit value in such a way that when the difference is smaller, the device is arranged to determine a quantized value by quantizing the difference, whereas when the difference is greater, the device is arranged to determine the quantized value by quantizing the original digitized value of the pixel.

20. The device according to claim 18, wherein the device comprises also a decoder for decoding the bit string in the way indicated by the code word.

21. The device according to claim 18, wherein the device also comprises a transceiver for performing mobile communication.

22. The device according to claim 18, wherein the device also comprises a transceiver for performing mobile communication.

23. A computer readable medium for storing software instructions for image processing with a limited number of bits in an encoded bit string of a pixel, as well as for encoding the pixel to the limited number of bits where said software instructions are executed by a processor to carry out the method of claim 1.

24. A camera module comprising the device of claim 18.

25. A circuit for image processing, which circuit comprises an encoder and a decoder, which encoder comprises encoding means configured to encode a pixel to an encoded bit string, in which the number of bits is fixed, wherein:
if a prediction value is not available for the pixel, the encoding means is configured to encode a quantized pixel value to the bit string,
if the prediction value is available, the encoding means is configured to determine
a difference between the pixel value and the prediction value, which difference is used for selecting a method for encoding among more than two encoding methods to encode said pixel into the bit string, each method for encoding having a certain step size for quantizing a value, and said certain step size being different in each method for encoding determine a code word indicating the selected encoding method on the basis of the original and limited number of bits in the pixel in such a way that the code word length does not exceed N−(M−1) where M corresponds to the limited number of bits and N corresponds to the original number of bits, and,
to encode said code word indicating the selected encoding method and quantizer step sizes and the quantizer value to the bit string,
in which the circuit the bit string has fixed-length smaller than the length of the originally digitized pixel for each encoded pixel in the image.

26. The circuit according to claim 25, wherein the encoding method to be used is differential pulse code modulation or pulse code modulation coding.

27. The circuit according to claim 25, wherein the encoding method to be used is ordinary differential pulse code modulation coding or smart differential pulse code modulation coding.

28. The circuit according to claim 25, wherein the decoder is arranged to decode the bit string by a decoding method corresponding to the encoding method used.

29. A device for image processing, comprising:
a decoder for decoding an encoded bit string to obtain pixels of an image, in which bit string the number of bits is fixed,
wherein the bit string comprises a code word and a value, wherein the decoder comprises decoding means configured
to recognize the code word to select a decoding method indicated by the code word among at least a first decoding method and a second decoding method corresponding with the encoding method used in forming the bit string;
to determine a dequantizer value on the bases of the selected decoding method,
wherein the decoder comprises a memory for storing at least one decoded pixel as a prediction value, wherein the device is arranged to retrieve the prediction value corresponding to the pixel from said memory,
wherein said code word has been determined on the basis of the original and the limited number of bits in the pixel in such a way that the code word length does not exceed $N-(M-1)$ where M corresponds to the limited number of bits and N corresponds to the original number of bits,
wherein said device is configured to dequantize said value by said dequantizer value to obtain a dequantized value, and
if the first decoding method was selected, the device is configured to use said dequantized value to obtain the pixel value,
if the second decoding method was selected, the device is configured to use said dequantized value and said prediction value to obtain the pixel value,
in which device the bit string has fixed-length smaller than the length of the obtained pixel value for each pixel in the image.

30. A device for image processing, which device comprises a processor configured to process an image, wherein the device comprises encoding means for encoding a pixel to an encoded bit string, in which the number of bits is fixed, wherein
if a prediction value is not available for the pixel:
the encoding means is configured to encode a quantized pixel value to the bit string, if the prediction value is available, wherein the encoding means is configured
to determine the difference between the pixel value and the prediction value, which difference is used for selecting a method for encoding among more than two encoding methods to encode said pixel into the bit string, each method for encoding having a certain step size for quantizing a value, and said certain step size being different in each method for encoding to determine a code word indicating the selected encoding method on the basis of the original and limited number of bits in the pixel in such a way that the code word length does not exceed $N-(M-1)$ where M corresponds to the limited number of bits and N corresponds to the original number of bits, and,
to encode the code word indicating the selected encoding method and the quantizer step sizes and the quantized value to the bit string;
in which device the bit string has fixed-length smaller than the length of the originally digitized pixel for each encoded pixel in the image.

* * * * *